United States Patent [19]

Tamai et al.

[11] Patent Number: 4,504,838
[45] Date of Patent: Mar. 12, 1985

[54] MULTI-COLOR PEN RECORDER

[75] Inventors: Hideo Tamai, Morioka; Kyuichi Fujisawa, Tonan, both of Japan

[73] Assignee: Alps Electric Co., Ltd., Japan

[21] Appl. No.: 513,128

[22] Filed: Jul. 11, 1983

Related U.S. Application Data

[63] Continuation of Ser. No. 325,293, Nov. 27, 1981, abandoned.

[30] Foreign Application Priority Data

Nov. 27, 1980 [JP] Japan ................................ 55/166974

[51] Int. Cl.³ ............................................. G01D 9/38
[52] U.S. Cl. .................................. 346/46; 346/139 R
[58] Field of Search ..................... 346/46, 64, 29, 35, 346/112, 141, 139 R

[56] References Cited

U.S. PATENT DOCUMENTS 3,550,276 11/1970 Kramer et al. ........................ 346/64
3,763,479 11/1973 Jebb et al. ............................ 346/29
4,165,513 8/1979 Flory .................................. 346/141

Primary Examiner—A. D. Pellinen
Assistant Examiner—Todd E. DeBoer
Attorney, Agent, or Firm—Guy W. Shoup

[57] ABSTRACT

A multi-color pen recorder having a carriage adapted to be shifted transversely of a recording paper and carrying a rotary drum which holds a plurality of pen means of different colors. Pen projecting means are provided to press and project only the pen means located at a predetermined printing position, toward the recording paper. The rotational driving of the rotary drum for the selection of the pen means is achieved by the power derived from the power source for shifting the carriage.

18 Claims, 6 Drawing Figures

MULTI-COLOR PEN RECORDER

This is a continuation of application Ser. No. 06/325,293 filed Nov. 27, 1981 now abandoned.

BACKGROUND OF THE INVENTION

The present invention relates to a multi-color pen recorder suitable for use in devices such as X-Y plotters, graphic printers, alphanumeric printers and the like.

Recently, personal computers are becoming popular and are being used even in the home. It is also a current tendency that recording devices such as CRT (Cathode Ray Tube) used in combination with personal computers are designed and constructed to make a color display of graphs, patterns or characters.

However, only few proposals have been made hitherto as to recording devices which can make color recording for permanent preservation of the characters or data as the result of operation of the personal computers. The multi-color recorders hitherto proposed are generally expensive and large-sized and, therefore, are not suitable for use in combination with personal computers.

More specifically, a multi-color ink-jet type printer, which is one of typical multi-color recording devices proposed hitherto, is still too expensive and has an impractically large size. Also, an X-Y plotter which is another example of conventional multi-color recording devices has a large size and complicated construction. Namely, as shown in FIG. 1, the X-Y plotter has a carriage 2 holding a single pen and mounted on a slide arm 1 for free sliding movement in X direction. The slide arm 1 in turn is mounted for free sliding movement along a stationary arm 4. For effecting a multi-color recording, the slide arm 1 and the carriage 2 are driven to return the pen 3a presently held by the carriage 2 to the pen-holding section of the stationary arm 4 and then the slide arm 1 and the carriage 2 are driven to make the carriage 2 hold a pen of another color, e.g. a pen 3b. This conventional system thus requires a complicated structure and control for the changing of the pen, and an impractically large space.

To avoid this problem, there has been proposed another structure in which as shown in FIG. 2, a slide arm 7 holding a carriage 6 for free movement in X direction is movable in Y direction along the stationary arm 8, while the carriage 6 carries a plurality of pens 5a, 5b and 5c, thereby to eliminate the troublesome changing operations of pens. This arrangement, however, requires that the carriage 6 is equipped with actuators such as solenoids for respective pens, in order to project the desired pen independently toward the recording paper, although the changing operations of pens are eliminated. This hinders the reduction of the size and weight of the carriage 6, and requires a function for controlling the position of the carriage 6 in relation to the positions of the pens, because pens occupy different positions on the carriage 6.

SUMMARY OF THE INVENTION

Accordingly, an object of the invention is to provide a less-expensive multi-color pen recorder capable of making a multi-color recording and having reduced size and weight.

Another object of the invention is to provide a handy multi-color pen recorder suitable for use in combination with personal computers, measuring devices and so forth.

Still another object of the invention is to provide a multi-color pen recorder having a small-sized and lightweight carriage which is not required to carry independent actuators such as solenoids for actuating respective pens.

A further object of the invention is to provide a multi-color pen recorder in which the color changing operation of pens is achieved by making use of the power derived from a power source for shifting the carriage, so that the color changing mechanism is simplified and reduced in size to lower its cost.

A multi-color pen recorder according to the present invention comprises a means for moving a recording paper; a carriage comprising a rotary drum and a plurality of pen means; means for shifting the carriage transversely of the recording paper; means for rotating the rotary drum to bring a selected one of the pen means to a printing position; and pen projecting means for pressing and projecting only one pen means at the printing position.

The means for moving a recording paper is preferably a platen with a shaft operably connected to a pulse motor via gears. It is rotatable in either of rotational directions according to the instructions from a control system.

The carriage comprises a rotary drum which is rotatable about a central shaft mounted on fore and rear plate members. The rotary drum is equipped with a coaxial ratchet which is engageable with a projection mounted on the frame of the pen recorder upon moving the carriage toward the projection, so that it functions to rotate the rotary drum. The ratchet may be prevented from a reverse rotation by a pawl mounted on the carriage. The rotary drum may also comprise an indexing means for making sure that a selected pen means is in the printing position. The indexing means comprises a corrugated ring formed on an annular part of the rotary drum surface, and a leaf spring mounted on the carriage and engageable with the corrugated ring.

The carriage also comprises a plurality of pen means which may be different in color. The pen means are arranged in the rotary drum circularly and in parallel with the central shaft. The rear ends of the pen means project from the fore end of the rotary drum and the fore ends thereof project through holes of a leaf spring preferably in a petal shape mounted on the rear end of the rotary drum. The tips of the pen means may be brought into contact with the recording paper by pushing the rear ends of the pen means selectively.

The means for shifting the carriage comprises one or more guide shafts on which the carriage is movable in either direction, and a means for moving the carriage which preferably comprises a cord connected to the carriage and movable back and forth along the guide shaft or shafts and a driving motor for moving the cord.

As mentioned above, the rotation of the rotary drum is made by engagement of the ratchet with the projection mounted on the frame of the pen recorder. The projection is so arranged that it can push one tooth of the ratchet when the carriage is moved toward the projection, to rotate the rotary drum by one pitch. When the carriage disengages from the projection, the rotary drum is not rotated due to the pawl. Accordingly, the desired pen means can be selected by repeating the back and forth movement of the carriage. Thus, the carriage of the present invention does not necessitate a driving motor mounted thereon for rotating the drum.

The pen projecting means comprises a hammer means for pushing the rear end of the pen means to project it onto the recording paper. The hammer means is rotatably received in a vertical groove of the fore plate means of the carriage and moves together with it, in the direction of the guide shafts, so that a pen means facing the groove is always a selected one to be projected. The hammer means may be slidably mounted on a shaft extending horizontally between both side walls of the pen recorder. In this case, the hammer means is splined to the shaft slidably in the longitudinal direction of the shaft. When the shaft is actuated by a driving means, the hammer means is moved to push the rear end of the pen means.

The driving means for the platen, the carriage and the hammer means may be actuated by signals supplied from a control system so that by the cooperation of the platen, the carriage and the hammer means, the pen means is moved to write letters, numerals, lines, etc. on the recording paper.

DESCRIPTION OF THE PREFERRED EMBODIMENTS

Figure 1:
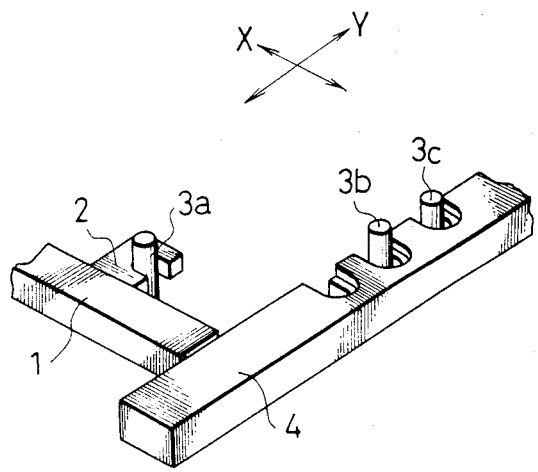
FIG. 1 is a simplified perspective view of a pen changing mechanism incorporated in an X-Y plotter of the prior art.
Figure 2:
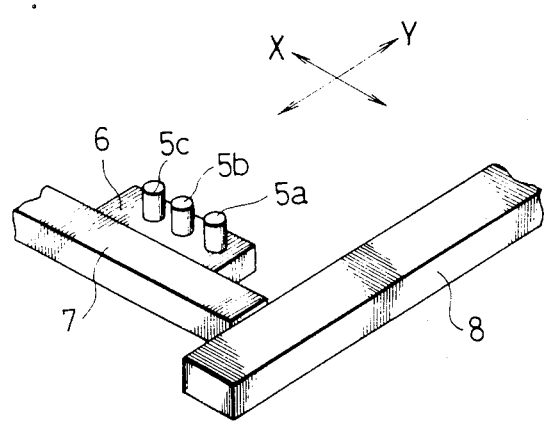
FIG. 2 is a partly exploded perspective view of a mechanism around the carriage of another X-Y plotter of the prior art.
Figure 3:
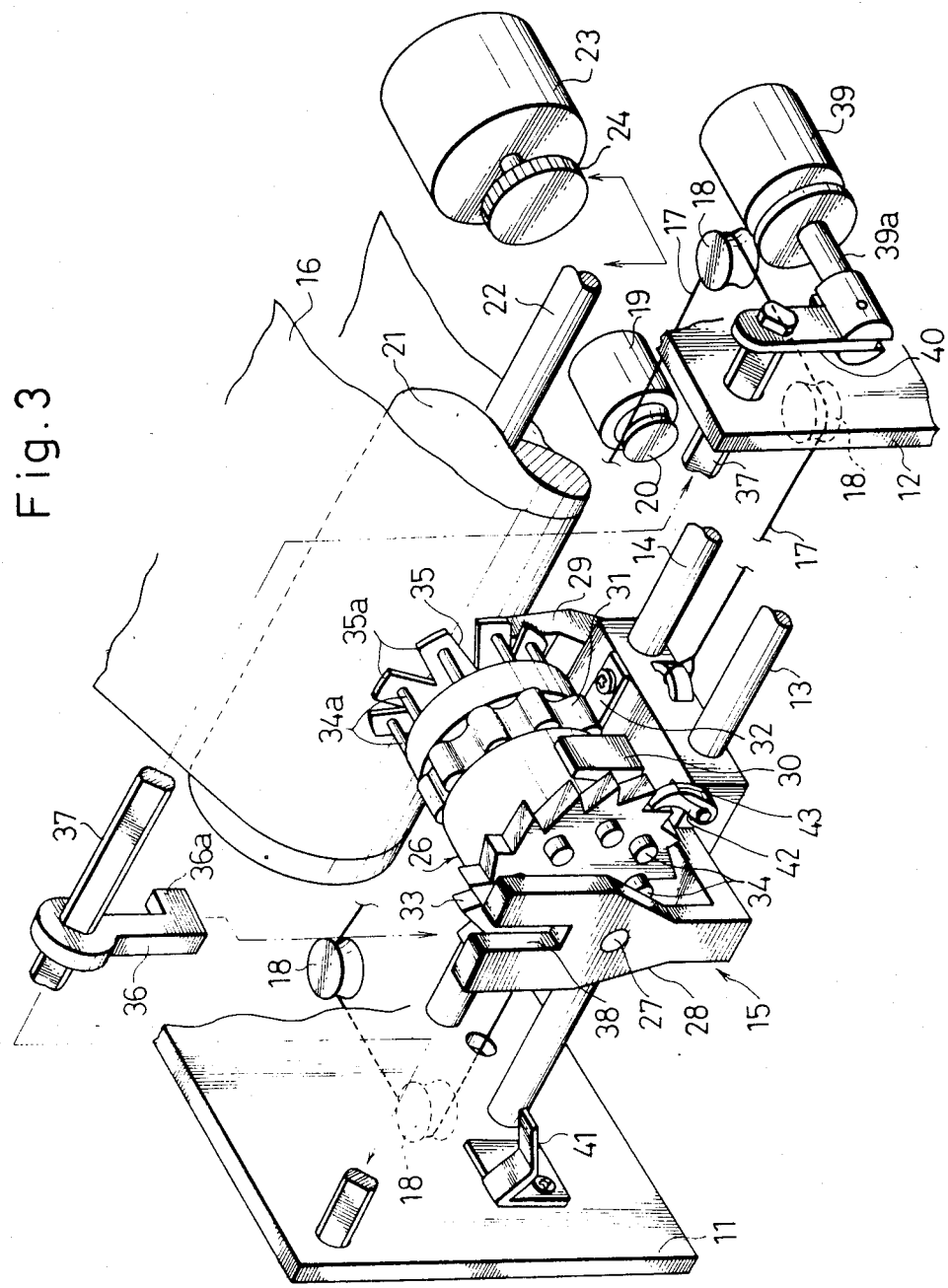
FIG. 3 is a partly simplified perspective view of a multi-color pen recorder in accordance with the present invention.

A preferred embodiment of the invention will be described hereinunder with reference to FIGS. 3 to 6. This embodiment is a small-sized graphic printer capable of performing an alphanumeric printing.

Referring to the drawings, reference numbers 11 and 12 denote side frames between which are extended a pair of guide shafts 13,14. A carriage 15 is mounted on the guide shafts 13,14 in such a manner as to be able to slide across a recording paper 16. A cord 17 is mounted around pulleys 18 and has both ends connected to respective sides of the carriage 15 and an intermediate portion wound around a driving pulley 20 of a reversible pulse motor 19, so that the carriage 15 is movable in either direction on guide shafts 13,14 in accordance with the forward and backward operation of the pulse motor 19.

A reference number 21 designates a platen having a double function as a support surface for writing and a paper feed roll. Although not shown, a shaft 22 of the platen 21 is operably connected to the drive gear 24 of a reversible pulse motor 23 through suitable intermediate gear or gears. The recording paper 16, which is clamped between the platen 21 and an auxiliary roller 25 (see FIG. 4) is moved in the direction perpendicular to the direction of shift of the carriage 15, as the pulse motor 23 operates.

A rotary drum 26 preferably made of a plastic has a central shaft 27 integral therewith and is held rotatably between a front plate member 28 and a rear plate member 29, with a part of the peripheral surface thereof embraced by side support members 30 of the carriage 15.

A corrugated annular portion 31 formed on a part of the peripheral surface of the rotary drum 26 constitutes, in cooperation with a leaf spring 32 (See FIG. 6) adapted to engage the concaved part of the portion 31, an indexing means for positioning the rotary drum 26 in the predetermined rotational direction. The number of clicks or stop positions of the drum provided by the indexing means corresponds to the number of teeth of the ratchet 33. The ratchet 33 (or cam means) is fixed to or integral with the fore end surface of the rotary drum 26 and has a plurality of equally spaced teeth of a number which is n times as large as the number of pen means 34, wherein n may be 1 or any other integer. Although the ratchet 33 is provided at the end surface of the rotary drum 26 in the illustrated embodiment, this is not exclusive and the ratchet 33 may be provided on any part of the peripheral surface of the rotary drum 26.

The printer of this embodiment has a plurality of pen means 34 . . . each of which may be constituted by cheap and light-weight means such as a changeable core of a ball-point pen or a felt pen of small size impregnated with a nonvolatile ink. These pen means have different colors and are adapted to write lines of respective colors on the recording paper 16. The pen means 34 are arranged on a circle about the axis of the rotary drum 26 in parallel therewith. The pen means 34 have tips 34a projecting from the rear end surface of the carriage 15 toward the platen 21 and rear ends projecting from the end surface of the ratchet 33. The pen means 34 are held in the carriage 15 in such a manner that they are projectable by a predetermined distance in parallel with the central shaft 27 toward the record paper 16.

A reference number 35 designates a petal-shaped leaf spring fixed to the central shaft 27 of the rotary drum 26 at its central portion. The leaf spring 35 has a plurality of resilient arms 35a radially projecting from the center thereof. The resilient arms have holes for receiving and holding the conical portions of tips 34a of respective pen means 34 to bias the latter leftward as viewed in FIG. 4. Each pen tip 34a extends through the hole of the associated resilient arm 35a, so that the pen tip 34a can come into contact with the recording paper 16 as the pen means 34 is pressed toward the recording paper against the force of the associated resilient arm 35a.

Figure 4:
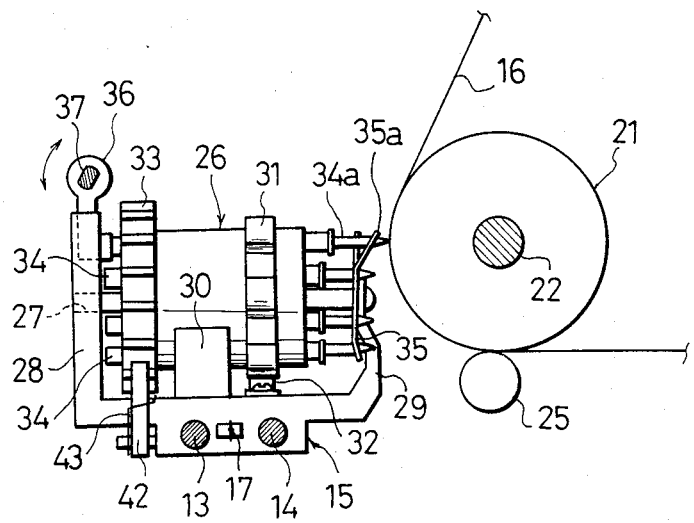
FIG. 4 is a right side elevational view of the mechanism around the carriage of the multi-color pen recorder of the invention, in the state of recording operation.

A reference number 36 indicates a hammer (pen projecting means) for pressing and projecting the pen means 34 toward the recording paper 16, see FIG. 4. The hammer 36 has a root portion having a hole and an L-shaped tip portion. A hammer driving shaft 37 extends between the side frames 11,12. The hammer 36 is mounted on the shaft 37 in such a manner that the shaft 37 penetrates through the hole of the hammer 36 and the hammer may freely slide along the shaft 37. Since the hammer 36 is splined to the hammer shaft 37, the hammer 36 is rotated when the shaft 37 is rotated.

The tip portion of the hammer 36 is kept in engagement with a vertical groove 38 in the front plate means 28 of the carriage 15, and the hammer 36 is adapted to be shifted as a unit with the carriage 15 as the latter is shifted. The hammer 36 is so positioned that its pressing surface 36a is positioned to oppose only to the rear end of the pen means 34 in the printing position. Thus, when the hammer 36 is driven by the shaft 37 to rotate toward the platen 21, only the pen means 34 in the printing position, i.e., the uppermost position in the figures is pressed against the recording paper 16 against the force of the resilient arm 35a.

A reference number 39 designates a solenoid plunger constituting an actuator for rotating the hammer shaft 37. The hammer shaft 37 is secured at its one end to a lever 40 which in turn is connected to an operation shaft 39a of the plunger 39. Although not shown, a spring is used to continuously bias the operation rod 39a in the forward or projecting direction so that, when the solenoid plunger 39 is not energized, the hammer 36 is positioned a small distance separate from the rear end of the pen means 34. However, as the solenoid plunger 39 is energized, the hammer 36 is rotated to push the pen shaft 34 through the action of the hammer shaft 27.

Therefore, it is possible to write any desired characters, charts and so forth on the recording paper 16 by actuating the pulse motors 19 and 23 to move the carriage 15 and/or the recording paper 16 in accordance with printing instructions, in the state where the solenoid plunger 39 is kept energized, i.e., in the state in which the tip 34a of the pen means 34 is pressed against the recording paper at a moderate pressure.

Figure 5:
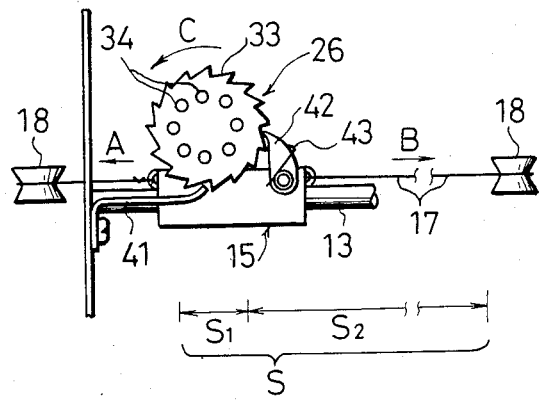
FIG. 5 is a partly removed front elevational view of a pen selecting mechanism (color changing mechanism) in the multi-color pen recorder.
Figure 6:
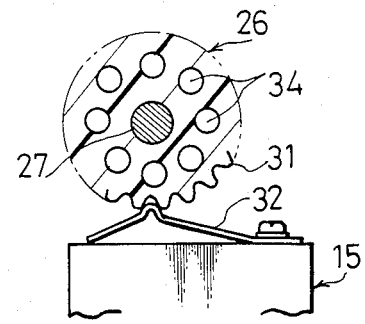
FIG. 6 is a partly removed and simplified sectional front elevational view of a multi-color pen recorder of the invention, particularly showing a rotary drum indexing device.

Referring to FIG. 5, the whole stroke "S" of the carriage 15 along the guide shafts 13,14 consists of two regions; a printing region "$S_2$" and a pen selection (color changing) region, "$S_1$"; where a projection 41 constituted by a leaf spring is secured to the side wall 11. When the carriage 15 is moved in the region "$S_1$" in the direction of arrow A, a tooth of the ratchet 33 is brought into contact with the projection 41 to rotate the ratchet 33 by one pitch in the direction of arrow C. Next, when the carriage 15 is moved in the direction of arrow B, it disengages from the projection 41, while keeping the rotational position of the ratchet 33 by a pawl 42 resiliently pressed by a spring 43 into engagement with the ratchet 33. The pawl 42 resists the rotational force caused by the projection 41 when the projection 41 slides over the teeth of the ratchet 33 while being subjected to a resilient deformation during the return of the carriage 15, thereby to prevent the reverse rotation of the ratchet 33.

It is, therefore, possible to effect the selection or changing of the pen means 34 by repeating reciprocation of the carriage 15 to rotate the ratchet 33, i.e., the rotary drum 26, until the desired pen means 34 reaches the printing position.

The power for the selection or changing the pen means 34 is derived from the pulse motor 19 for shifting the carriage 15 by actuating the latter in forward or backward direction by a predetermined amount. Thus, specific driving power source for the pen selection or changing operation is eliminated to permit the pen changing mechanism to have a simplified and compact construction.

Although in the illustrated embodiment a so-called detent mechanism is used as indexing means for determining the rotational position of the rotary drum 26, this is not exclusive and various other means can be used as means for indexing the rotary drum 26.

As has been described, according to the invention, there is provided a multi-color pen recorder having a plurality of pen means of different colors carried by a rotary drum which is adapted to be rotated to such a rotational position that the pen means of the desired color is opposed to a pen projecting means adapted to project and press the pen means against the recording paper, the pen projecting means being adapted to be driven by a pen projecting driving shaft and to be held by the carriage so that it can move together with the carriage over the entire stroke of shifting of the carriage.

Consequently, the selection of the pen means is facilitated and the pen changing mechanism is simplified, while eliminating the necessity for mounting a heavy pen driving power source such as solenoids on the carriage. This in turn reduces the weight and size of the carriage and affords a high-speed operation of the carriage, so that the size of the carriage shifting motor is reduced. In consequence, according to the invention, it is possible to obtain, to a great advantage in the field of the industry concerned, a multi-color pen recorder having a much reduced size and weight.

In addition, according to the invention, it is not necessary to use specific driving or actuating power sources for the selection of pens, because the necessary power of driving the rotary drum is derived from the driving power source for shifting the carriage, so that the color changing mechanism is simplified and made smaller to reduce its cost.

What is claimed is:

1. A multi-color pen recorder comprising:
   (a) frame means for mounting the various portions of the recorder;
   (b) means mounted on the frame for moving a recording paper in one direction, during recording thereon, in accordance with printing instructions;
   (c) a carriage slidably mounted relative to the frame means;
   (d) a rotary drum rotatably mounted on the carriage means;
   (e) a plurality of pen means for placing visible marks on the recording paper and arranged in said rotary drum circularly about the axis thereof, said pen means being projectable relative to the drum in parallel with the axis of said rotary drum;
   (f) means for sliding said carriage transversely of the direction of said movement of said recording paper in accordance with printing instructions;
   (g) means for rotating said rotary drum to bring a selected one of said pen means to a marking position; and
   (h) pen projecting means adapted to press and project only said pen means positioned at the marking position.

2. A multi-color pen recorder according to claim 1 further comprising an elongated shaft physically extending over the entire traverse movement of said carriage and adapted to drive said pen projecting means; and means mounted on said frame for rotationally driving said shaft.

3. A multi-color pen recorder according to claim 2, wherein said carriage sliding movement means comprises a reversible pulse motor, and said paper moving means comprises another reversible pulse motor, and wherein said means for rotationally driving said shaft comprises a solenoid plunger.

4. A multi-color pen recorder according to any one of the claims 1–3, wherein each pen means has a conical portion, a tip of which is a printing portion capable of making a printing on said recording paper, and said carriage comprises a spring means having holes each engaging said conical portion of said pen means to bias said pen means away from said recording paper.

5. A multi-color pen recorder according to claim 4, wherein said spring means is fixed to said rotary drum at the center, and has the same number of arms each having one hole as that of said pen means, said arms being constituted by a plurality of leaf springs radially extending from the center of said spring means.

6. A multi-color pen recorder according to claim 5, wherein said carriage includes an indexing means which comprises a corrugated ring coaxial with said rotary drum and a spring means adapted to engage one of the valleys of said ring.

7. A multi-color pen recorder according to any one of the claims 1–3, wherein said carriage includes an indexing means which comprises a corrugated ring coaxial with said rotary drum and a spring means adapted to engage one of the valleys of said ring.

8. A multi-color pen recorder comprising, as portions mounted on a frame,
   (a) means for moving a recording paper, during recording, in the Y direction, in accordance with printing instructions;
   (b) a carriage slidably shiftable in the X direction across the paper;
   (c) a rotary drum rotatably mounted on the carriage;
   (d) a plurality of pen means arranged in the rotary drum circularly about the axis thereof, each of said pen means being projectable, one at a time, in parallel with the axis of said rotary drum;
   (e) means for shifting said carriage transversely of said recording paper;
   (f) means for rotating said rotary drum which comprises a toothed circular means coaxially fixed to the rotary drum; and a means fixed to said frame and which is engageable with said toothed circular means to rotate said rotary drum, and disengageable from said toothed circular means without rotating it, so that the reciprocating motion of said carriage in a pen selecting region of the stroke of said carriage in which said two engagable means engage can bring said rotary drum to a rotational position where said pen means of the desired color is in a marking position; and
   (g) pen projecting means to press and project only one of said pen means into a marking position on said paper.

9. A multi-color pen recorder according to claim 8, wherein said pen selecting region is at one end portion of the movement stroke of said carriage.

10. A multi-color pen recorder according to claim 8 or 9, wherein said toothed circular means comprises a ratchet, and said means for engaging said toothed circular means comprises a projection fixed on a side frame.

11. A multi-color pen recorder according claim 8 or 9, wherein said pen projecting means is rotatably received in a vertical groove of a front plate means of said carriage, the pressing surface thereof being engageable with only one of said pen means facing said groove, said pen projecting means being splined to a shaft extending over the entire movement of said carriage slidably in the longitudinal direction of said shaft, and said shaft being actuated by a driving means so as to rotate said pen projecting means.

12. A multi-color pen recorder according to claim 10, wherein said pen projecting means is rotatably received in a vertical groove of a front plate means of said carriage, the pressing surface thereof being engageable with only one of said pen means facing said groove, said pen projecting means being splined to a shaft extending over the entire movement of said carriage slidably in the longitudinal direction of said shaft, and said shaft being actuated by a driving means so as to rotate said pen projecting means.

13. A multi-color pen recorder comprising, as portions mounted on a frame,
   (a) means for moving a recording paper, during recording, in the Y direction, in accordance with printing instructions;
   (b) a carriage slidably shiftable in the X direction across the paper;
   (c) a rotary drum rotatably mounted on the carriage;
   (d) a plurality of pen means arranged in the rotary drum, each of said pen means being usable for printing one at a time;
   (e) means for shifting said carriage transversely of said recording paper;
   (f) means for rotating said rotary drum which comprises a circular means coaxially fixed to the rotary drum; and a means fixed to said frame and which is engageable with said circular means to rotate said rotary drum, and disengageable from said circular means without rotating it, so that the reciprocating motion of said carriage in a pen selecting region of the stroke of said carriage in which said two means engage can bring said rotary drum to a rotational position where said pen means of the desired color is in a marking position; and
   (g) pen pressing means to press said pen means of the desired color into a marking position on said paper.

14. A multi-color pen recorder according to claim 13 further comprising an elongated driving means extending over the entire movement of said carriage and adapted to drive said pen pressing means; and means mounted on said frame for rotationally driving said elongated driving means.

15. A multi-color pen recorder according to claims 13 or 14, wherein said carriage movement means comprises a reversible pulse motor, and said paper moving means comprises another reversible pulse motor, and wherein said means for rotationally driving said elongated driving means comprises a solenoid plunger.

16. A multi-color pen recorder according to claim 15, wherein each pen means has a conical portion, a tip of which is a printing portion capable of making a printing on said recording paper, and said carriage comprises a spring means having holes each engaging said conical portion of said pen means to bias said pen means away from said recording paper.

17. A multi-color pen recorder according to claim 16, wherein said spring means is fixed to said rotary drum at the center and has the same number of arms each having one hole as that of said pen means, said arms being constituted by a plurality of leaf springs radially extending from the center of said spring means.

18. A multi-color pen recorder according to claim 16, wherein said carriage includes an indexing means which comprises a corrugated ring coaxial with said rotary drum and a spring means adapted to engage one of valleys of said ring.

* * * * *